July 1, 1930.    J. T. NASH ET AL    1,769,533
GAUGE STICK
Filed March 31, 1928
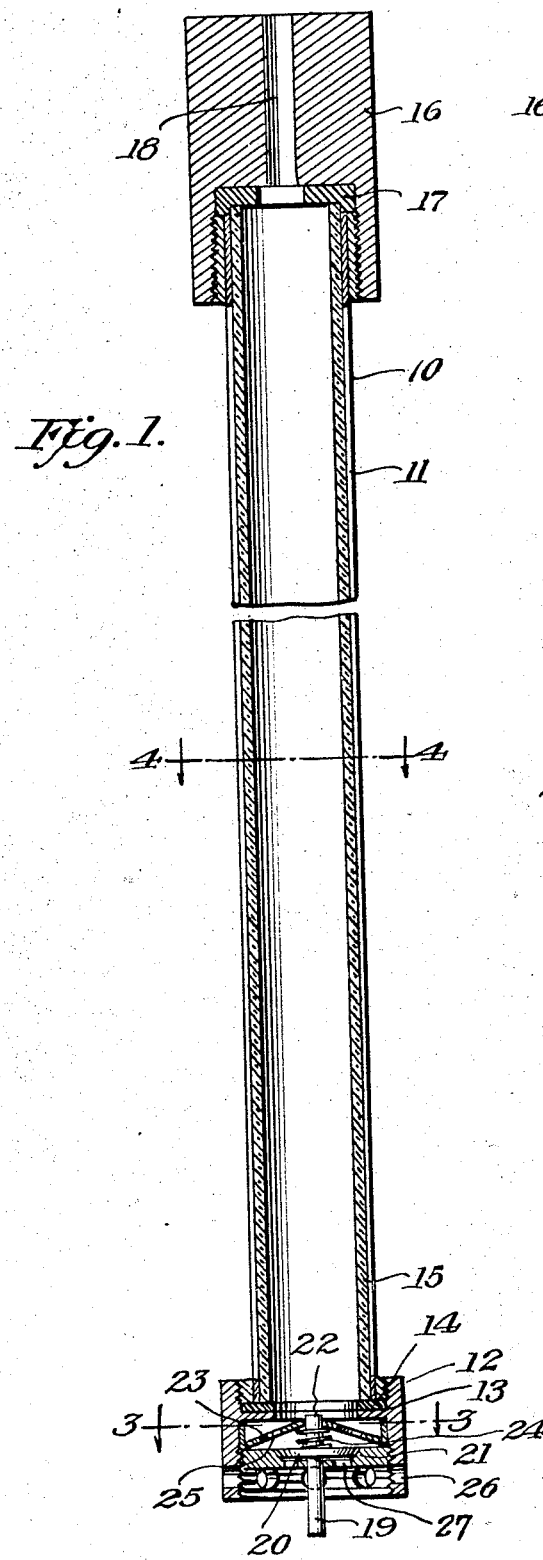
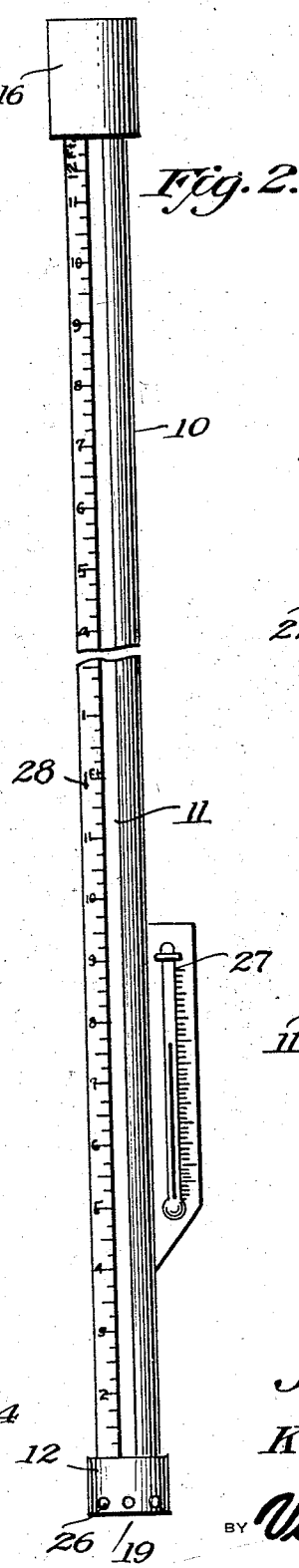
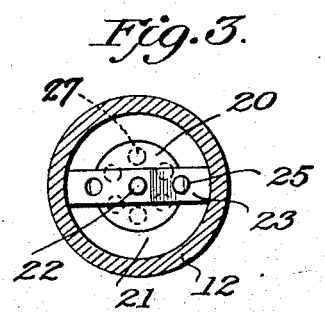
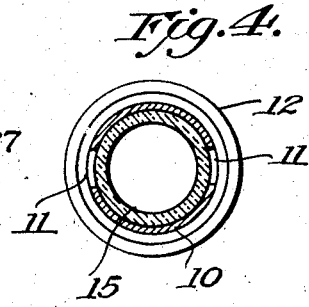
J.T.Nash
K.S.Nash
INVENTORS
BY Victor J. Evans
ATTORNEY Patented July 1, 1930

1,769,533

UNITED STATES PATENT OFFICE

JOHN T. NASH AND KELTON S. NASH, OF BEAUMONT, TEXAS

GAUGE STICK

Application filed March 31, 1928. Serial No. 266,341.

This invention has particular relation to measuring devices primarily adapted to determine liquid levels.

An object of the invention comprehends a housing member having automatically controlled valve means adapted to open and close when the housing is inserted and removed from a container.

Another object of the invention contemplates a receptacle adapted to be filled upon opening of the valve means.

An additional object of the invention embodies a scale adapted for registration with the receptacle to indicate the liquid level within a container.

More specifically stated the scale is adapted to synchronize with a thermometer to ascertain liquid levels at different temperatures.

With the above and other objects in view, the invention further consists of the following novel features and details of construction, to be hereinafter more fully described, illustrated in the accompanying drawing and pointed out in the appended claim.

In the drawing:

Figure 1 is a longitudinal sectional view taken through my invention.

Figure 2 is an elevation of the invention.

Figure 3 is a sectional view taken on line 3—3 of Figure 1.

Figure 4 is a sectional view taken on line 4—4 of Figure 1.

Referring to the drawing in detail, wherein like characters of reference denote corresponding parts, the reference character 10 indicates a tubular member or barrel having an elongated slot or sight opening 11. A valve chamber 12 carried upon the lowermost end of the barrel 10 and having a centrally apertured disk 13 horizontally disposed adjacent the uppermost end thereof and adapted to seat a washer 14 upon the upper side thereof.

A tube 15, carried within the barrel 10, is seated at its lower end upon the upper side of the washer or packing 14.

A cap 16, carried upon the uppermost end of the barrel 10 and having a packing or washer 17, is adapted for engagement with the uppermost end of the tube 15. A vent opening 18 in the cap 16 is adapted to permit escapement of air and gases when the tube is being filled whereby the particular measurement will be more nearly correct.

A valve construction, embodying a stem 19 having a head 20 adapted to be seated upon a seat 21, is mounted within the valve housing 12, as best illustrated in Figure 1 of the drawing. A shaft 22, upstanding from the valve head 20, is adapted to be extended through a brace member 23, located immediately above the valve seat 21. A compression spring 24 encircling the shaft 22 and interposed between the underside of the brace member 23 and upper side of the valve head 20, is adapted to normally retain the latter in the position shown in Figure 1. The brace member 23 is in addition provided with auxiliary openings 25, the purpose of which will be presently apparent. The valve housing adjacent the lowermost end thereof is provided with inlet openings 26. A thermometer 27 being carried upon one side of the sight opening 11 in the barrel 10 and a scale 28 upon the other. In the mode of operation of the invention and when the same is employed for determining liquid levels within storage tanks of gasoline service stations, etc., the device is lowered within the filling neck for the tank and the stem 19 is adapted to engage the bottom thereof. Such action causes the valve head 20 to be raised an appreciable extent to permit the ingress of the gasoline upwardly within the valve chamber 12 through the openings 25 in the brace member 23 and within the tube 15, preferably composed of transparent material. The weight of the device in and of itself will be sufficient to open the valve 20 against the tension of the spring 24. The device is left within the tank for a given time and when raised from the tank will be noted that the clearance between the valve head and the seat therefor will permit a quantity of the contents of the tube 15 to escape. It has been found that the loss is equivalent to that of a quarter inch reading on the scale 28 and such loss is added to the scale measurement when the device is wholly withdrawn from the tank.

Due to the contraction and expansion of liquids in different temperatures, the thermometer 27 is employed which is read in conjunction with the scale 28.

It will be noted that the device will prove of great value to persons engaged in the sale of petroleum and its by-products, inasmuch as splashing, incident to the insertion of the device, will not misinform the operator, as the exact liquid level plus an additional quarter inch is the liquid level within a container or tank.

The auxiliary openings 25 in the brace member 23 and openings 27 in the valve seat 21 about the connection of the valve stem therewith permit free and unrestricted passage of fluid, to be measured, upwardly within the tube 15. In other words, the openings will prevent the brace member from acting as a baffle to the liquid as it enters whereby sediment collected within the bottom of the tank will not be disturbed and the liquid in the tube will not be clouded to render an obscure reading.

The invention is susceptible of various changes in its proportions and minor details of construction and the right is herein reserved to make such changes as properly fall within the scope of the appended claim.

Having described the invention, what is claimed is:—

A gauge stick comprising a barrel having a sight opening, a tube carried within the barrel and visible through the sight opening, a valve housing of annular formation carried upon the lowermost end of the barrel and having horizontally disposed inlet openings, a seat mounted within the housing above the inlet openings and having a multiplicity of openings therein, a valve member having a stem slidably mounted within the central of the openings in the seat and projecting terminally therefrom beyond the lower periphery of the housing, a shaft carried by and upstanding from the valve member in oppositely disposed relation to the stem, a brace member carried by the seat and receiving the upper end of the shaft, and a compression spring encircling the shaft and sprung at its ends against the adajacent sides of the seat and brace member to normally induce the valve to occupy a closed position.

In testimony whereof we affix our signatures.

JOHN T. NASH.
KELTON S. NASH.